(12) United States Patent
Latschaw

(10) Patent No.: US 10,993,432 B2
(45) Date of Patent: *May 4, 2021

(54) WING STRUT FOR SUPPORTING THE WINGS OF A WATERFOWL DECOY

(71) Applicant: The Clone, LLC, Sherwood, OR (US)

(72) Inventor: Ron Latschaw, Quemado, NM (US)

(73) Assignee: The Clone, LLC, Sherwood, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/267,292

(22) Filed: Feb. 4, 2019

(65) Prior Publication Data

US 2019/0166825 A1 Jun. 6, 2019

Related U.S. Application Data

(63) Continuation of application No. 15/222,874, filed on Jul. 28, 2016, now Pat. No. 10,194,653.

(60) Provisional application No. 62/200,006, filed on Aug. 1, 2015.

(51) Int. Cl.
*A01M 31/06* (2006.01)

(52) U.S. Cl.
CPC .................. *A01M 31/06* (2013.01)

(58) Field of Classification Search
CPC .................................................. A01M 31/06
USPC ......................................................... 43/2, 3
See application file for complete search history.

(56) References Cited

U.S. PATENT DOCUMENTS

| | | | | |
|---|---|---|---|---|
| 547,553 A * | 10/1895 | Keller | ...................... | A63H 3/18 446/361 |
| 4,228,977 A * | 10/1980 | Tanaka | .................... | A63H 27/08 244/153 R |
| 4,669,684 A * | 6/1987 | Vernelson | ............... | A63H 27/08 244/153 R |
| 5,144,764 A * | 9/1992 | Peterson | ............... | A01M 31/06 43/3 |
| 5,231,780 A * | 8/1993 | Gazalski | ............... | A01M 31/06 43/3 |
| 6,293,042 B1 * | 9/2001 | Arvanitis, Jr. | ........ | A01M 31/06 43/3 |
| 7,739,826 B1 * | 6/2010 | Druliner | ............... | A01M 31/06 43/2 |
| 10,194,653 B2 * | 2/2019 | Latschaw | ............... | A01M 31/06 |
| 2004/0025400 A1 * | 2/2004 | Salato | ................... | A01M 31/06 43/3 |

* cited by examiner

*Primary Examiner* — David J Parsley
(74) *Attorney, Agent, or Firm* — Brian Beverly; Beeson Skinner Beverly, LLP

(57) ABSTRACT

A waterfowl decoy having oscillating wings includes an oscillation mechanism in the interior cavity of a waterfowl decoy body, a pair of wings attached to the oscillation mechanism and extending outwardly from the decoy body, each wing including a wing strut having a proximal portion for attachment to the oscillation mechanism, a distal portion extending from the proximal portion, the proximal and distal portions including an elongated band disposed in a wing plane aligned parallel to the longitudinal dimension of the decoy body, the proximal portion comprising reinforcing ribs oriented perpendicularly to the band, such that reciprocating movement of the wing gears causes the wings to oscillate in a motion resembling that of the flapping wings of a bird in flight.

13 Claims, 11 Drawing Sheets

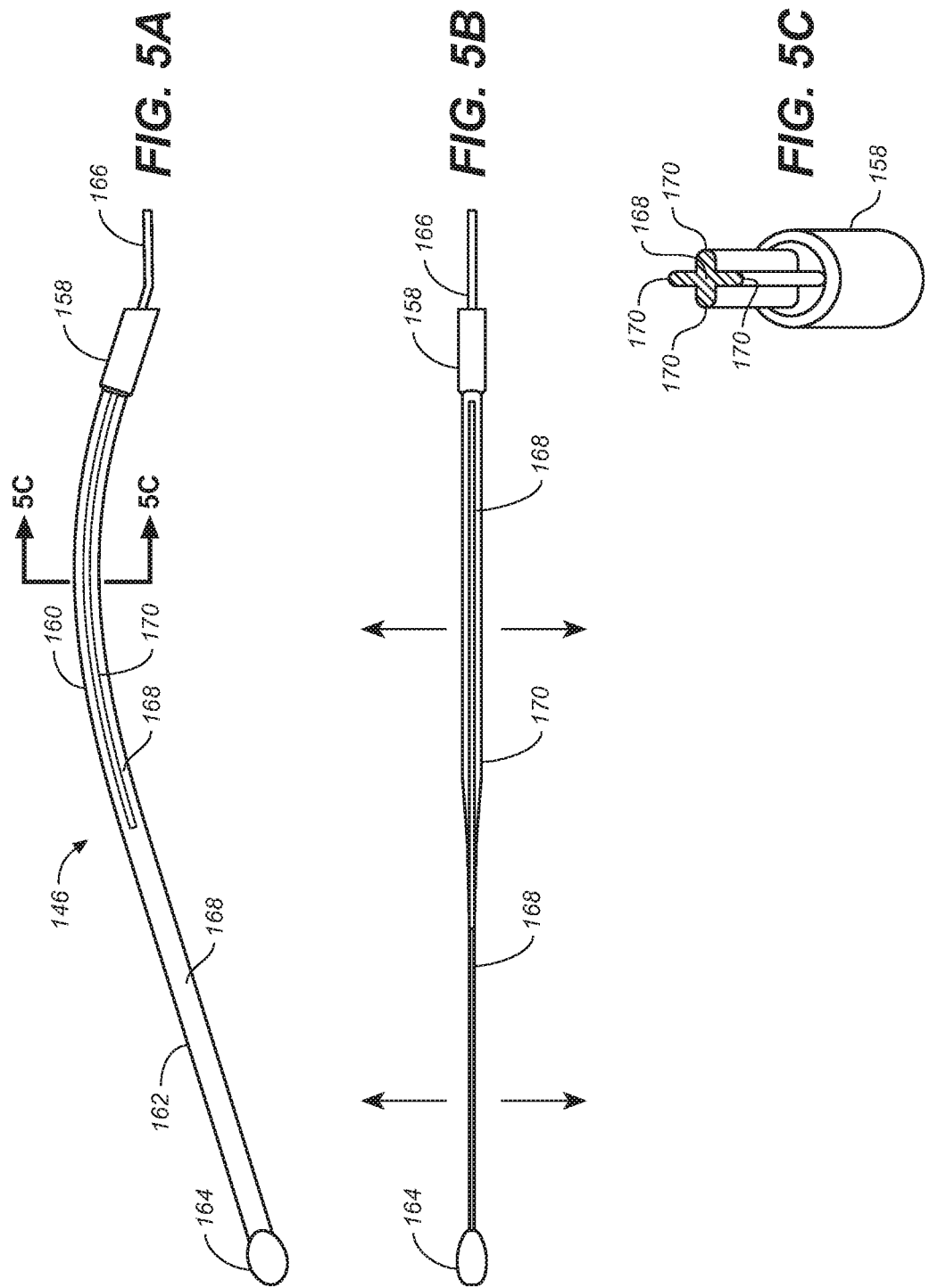

WING STRUT FOR SUPPORTING THE WINGS OF A WATERFOWL DECOY

CROSS-REFERENCE TO RELATED APPLICATIONS

This application is a continuation of U.S. application Ser. No. 15/222,874, filed Jul. 28, 2016, which claims the benefit of U.S. Provisional Application No. 62/200,006, filed Aug. 1, 2015.

BACKGROUND

Field of the Invention

The invention is directed to waterfowl decoys including moveable wingshaving a harmonic oscillation mechanism for moving the wings of the decoy in a reciprocal motion resembling the wing beat of a waterfowl, and particularly to a flexible wing strut for supporting the wings.

Discussion of the Prior Art

Waterfowl decoys are commonly deployed while hunting waterfowl to lure waterfowl within range. Many and varied attempts have been made to create waterfowl decoys that realistically emulate the appearance and action of live waterfowl. For example, a recent innovation provides a decoy with spinning wings which creates the illusion of the beating wings of a landing bird. Other decoys depend on wind to effect motions which it simulate lifelike wing movements. Despite these efforts, heretofore it has proved to be difficult and elusive to simulate realistically the complex flapping motion of a waterfowl's wings.

BRIEF DESCRIPTION OF THE DRAWINGS

FIG. 5A is a front elevation view of the wing strut of one of the wings thereof.

FIG. 5B is a plan view of the wing strut shown in FIG. 5A.

FIG. 5C is a cross-sectional view of the wing strut of FIG. 5A taken along line 5C-5C of FIG. 5A.

DETAILED DESCRIPTION OF THE ILLUSTRATED EMBODIMENTS

Figure 1A:
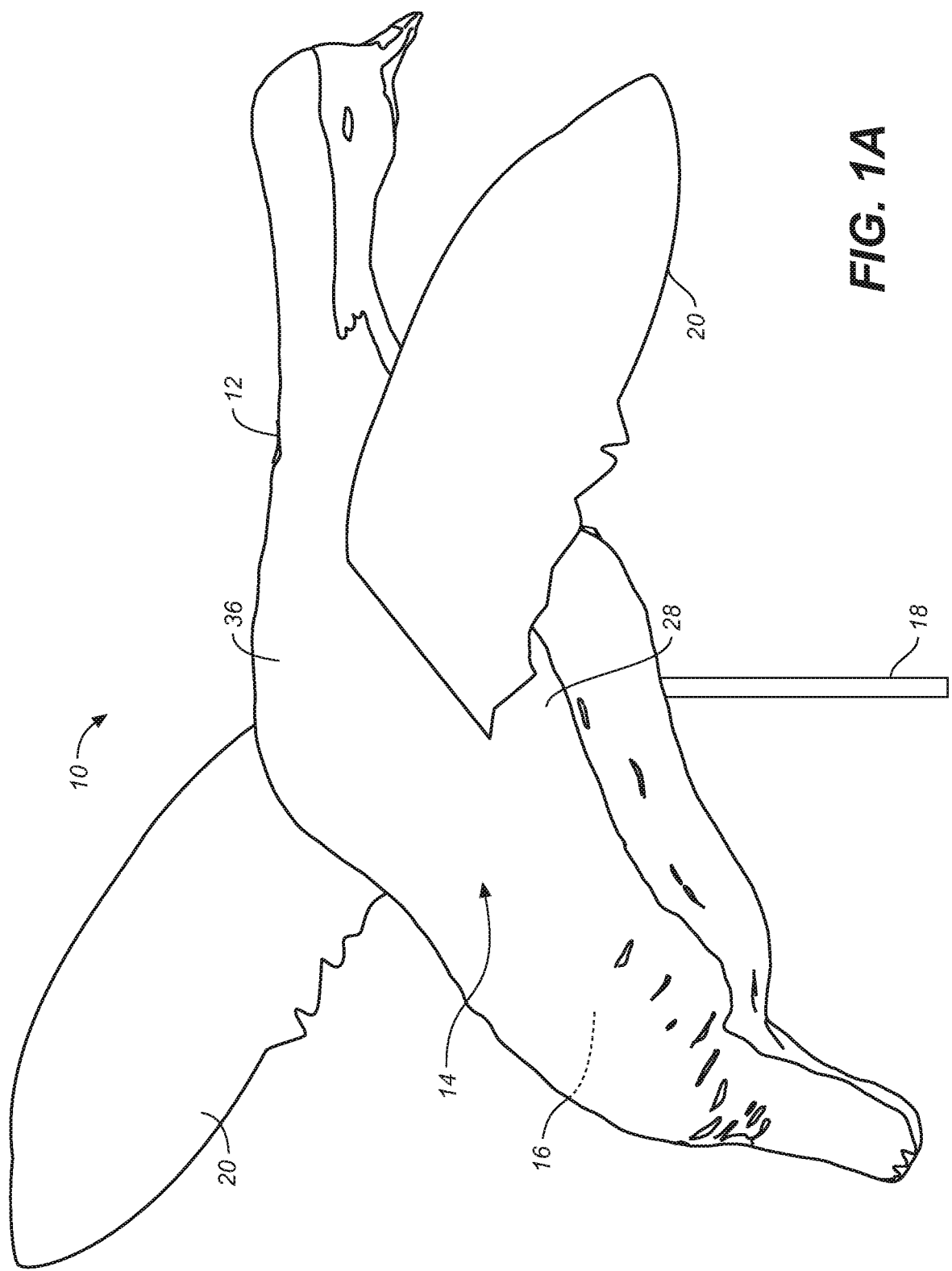
FIG. 1A is an upper perspective view of a waterfowl decoy having oscillating wings according to the invention.
Figure 1B:
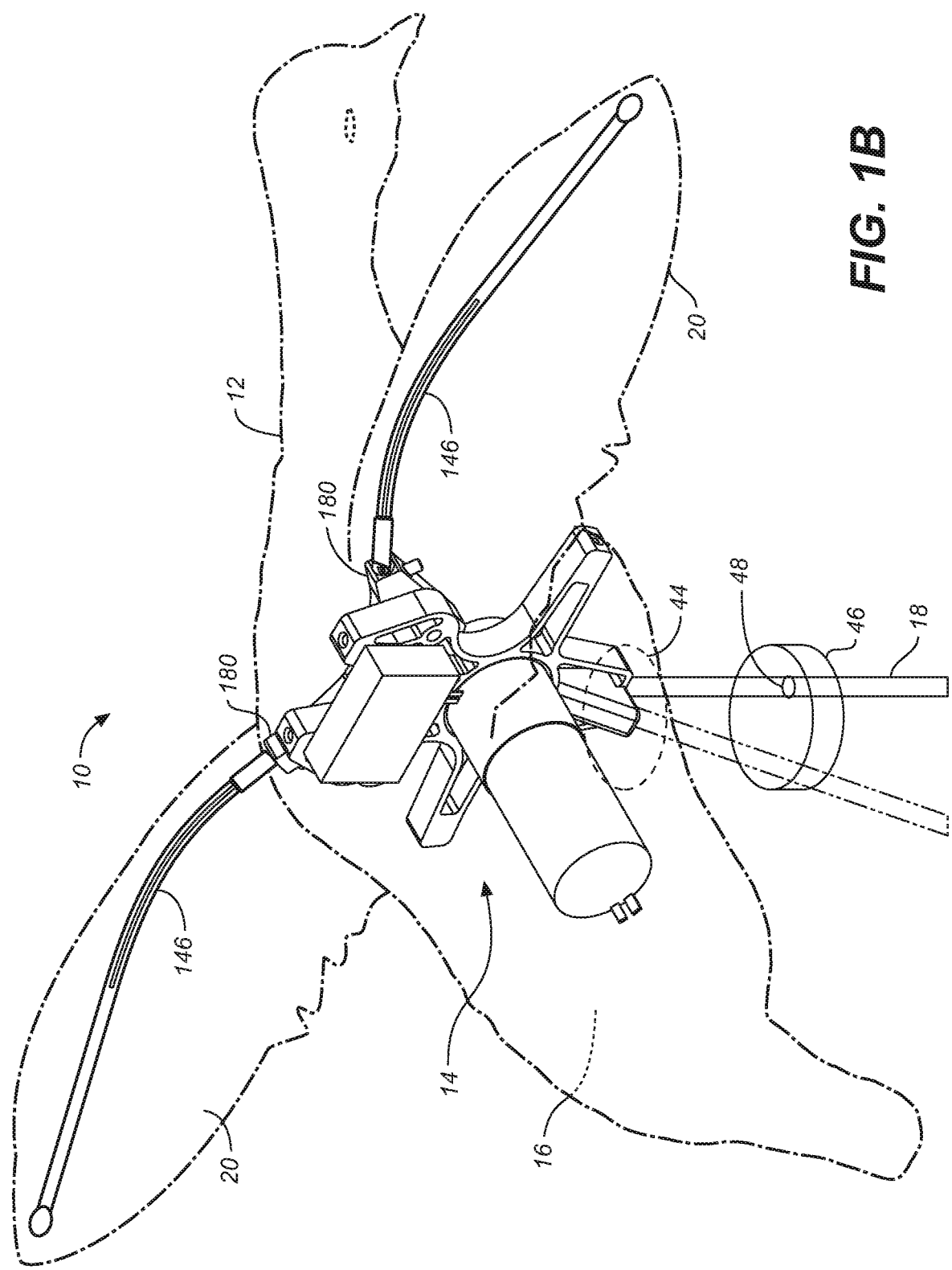
FIG. 1B is an upper perspective thereof with the decoy body shown in broken lines to reveal the oscillation mechanism and internal components of the wings.

A waterfowl decoy having oscillating wings, referred to generally at numeral 10 in FIGS. 1A and 1B, comprises a decoy body 12 having a shape resembling the body of a waterfowl in a downwardly arced landing posture. An oscillation mechanism 14 is anchored in the interior cavity 16 of the decoy body. The decoy body 12 and oscillating mechanism 14 are held in an elevated position above a support surface by support rod 18. A pair of wings 20 are operatively attached to the oscillating mechanism and to the decoy body 12 such that when the oscillating mechanism is activated the wings 20 move reciprocally up and down in a life-like flapping motion.

Figure 2:
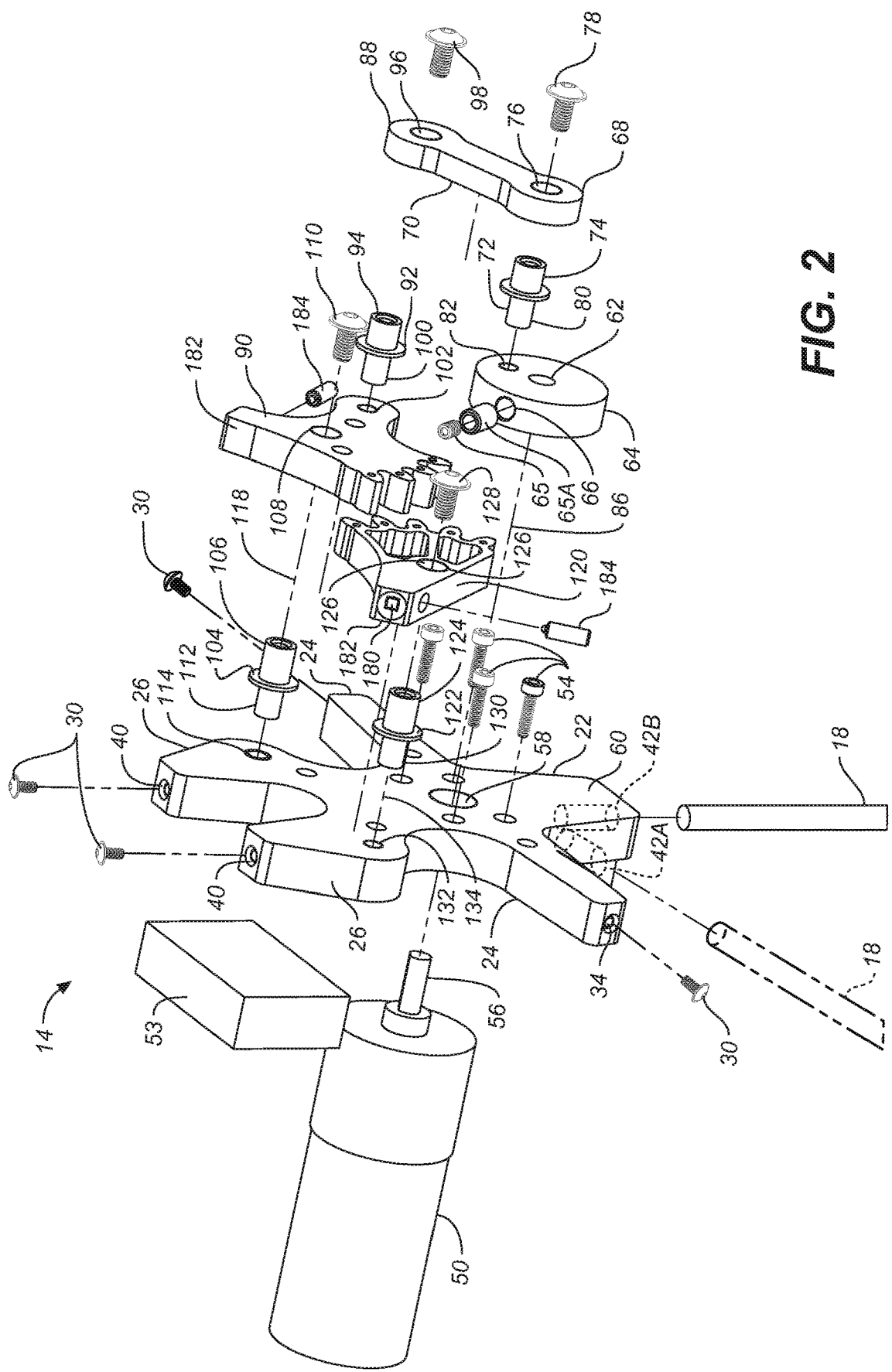
FIG. 2 is an upper right perspective view of the oscillation mechanism thereof.
Figure 6A:
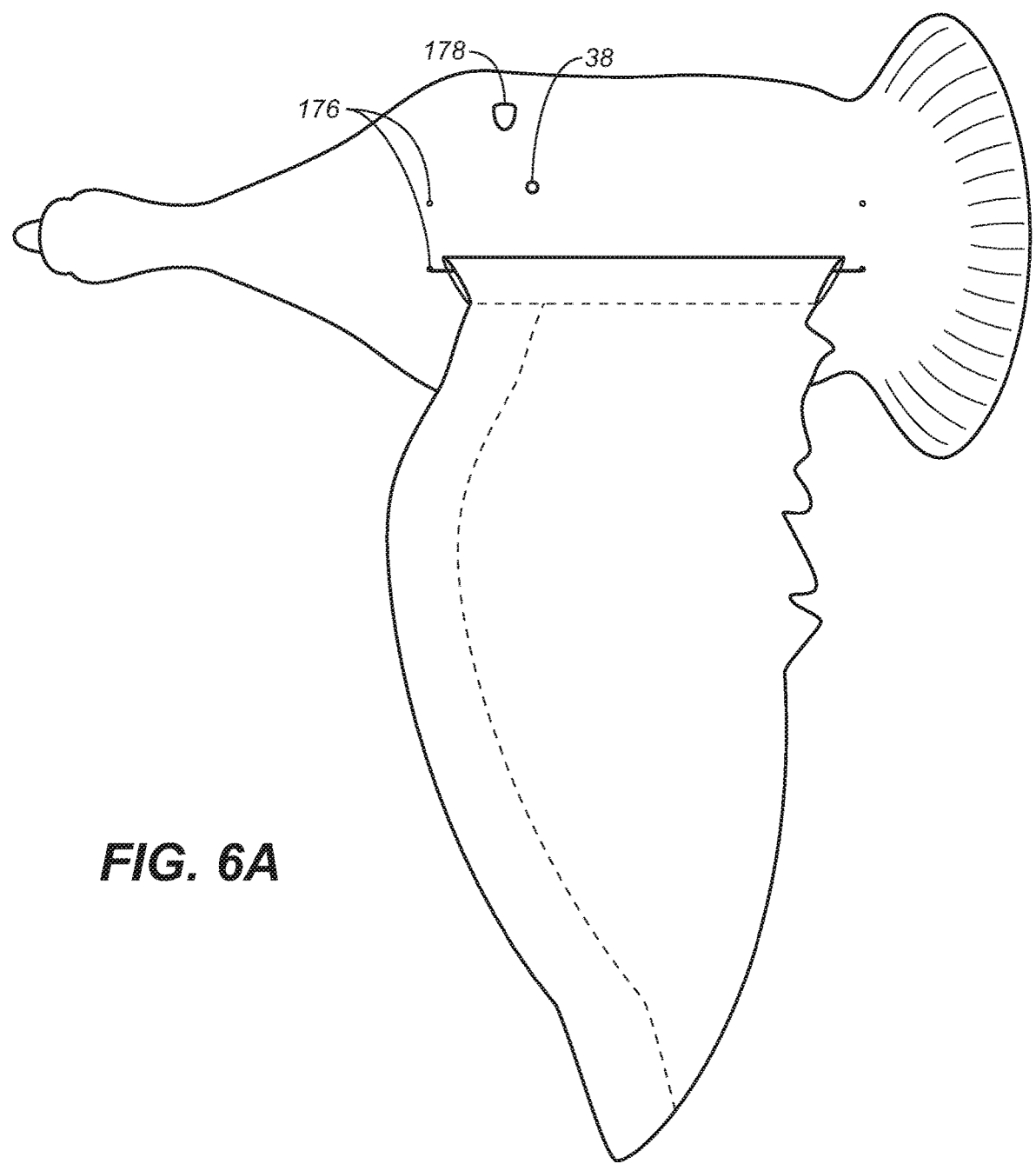
FIG. 6A is a top plan view of the decoy body thereof showing one attached to the body.
Figure 6B:
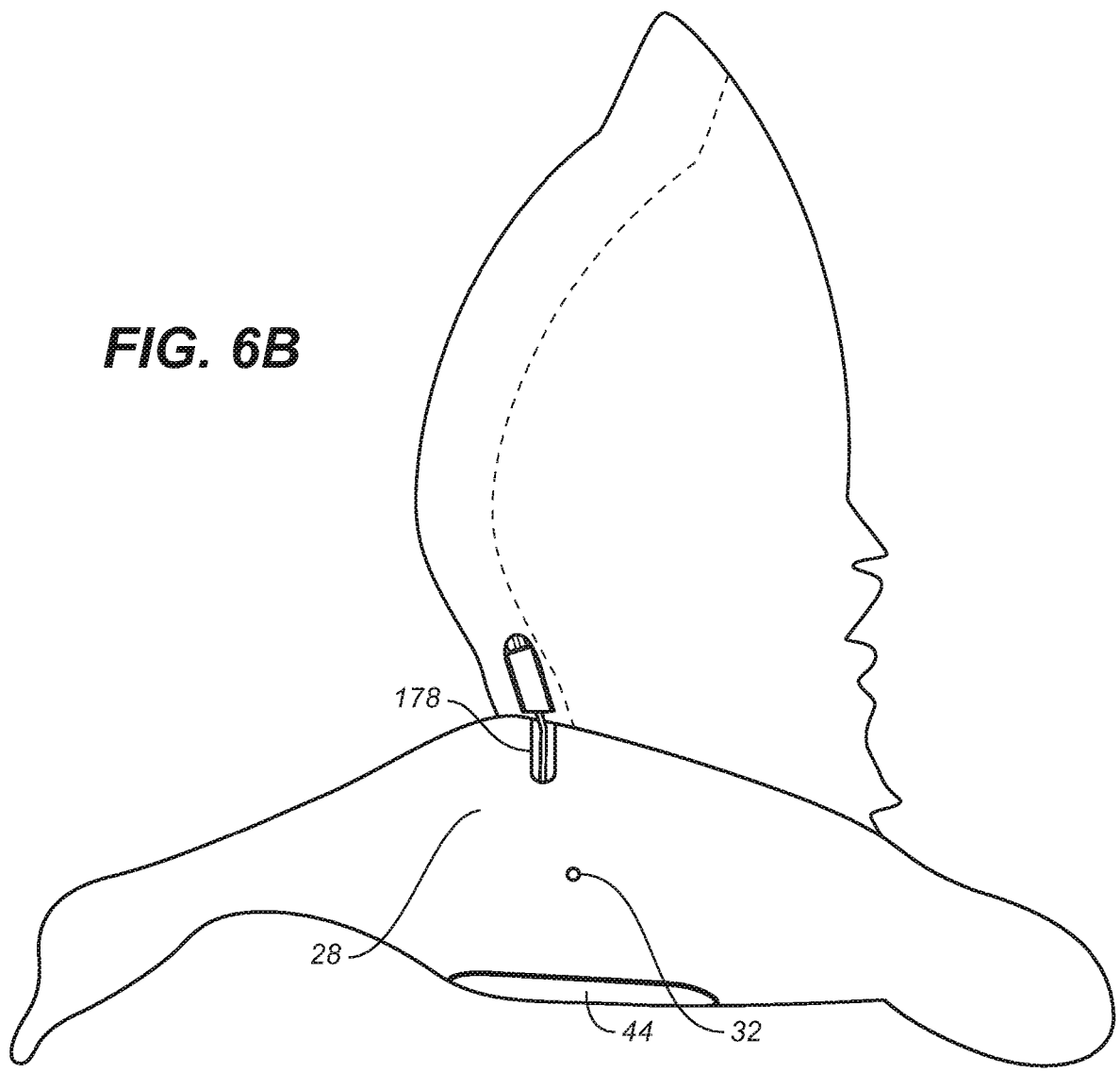
FIG. 6B is a side elevation view of the decoy body and wing seen in FIG. 6A showing the wing in a raised posture.
Figure 7A:
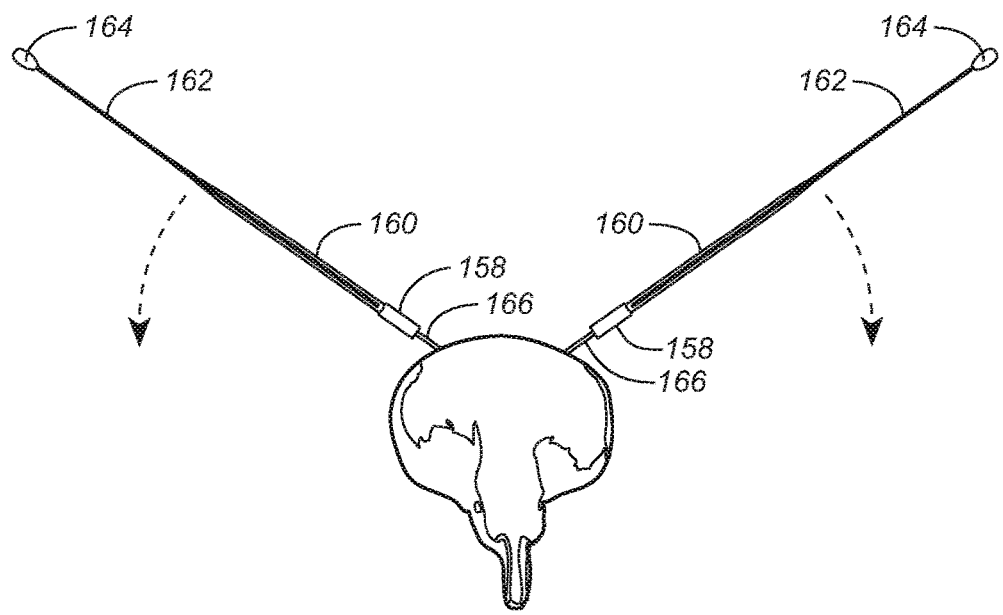
FIG. 7A is a front elevation view thereof showing the wings raised at an angle to the body and moving downward.
Figure 7B:
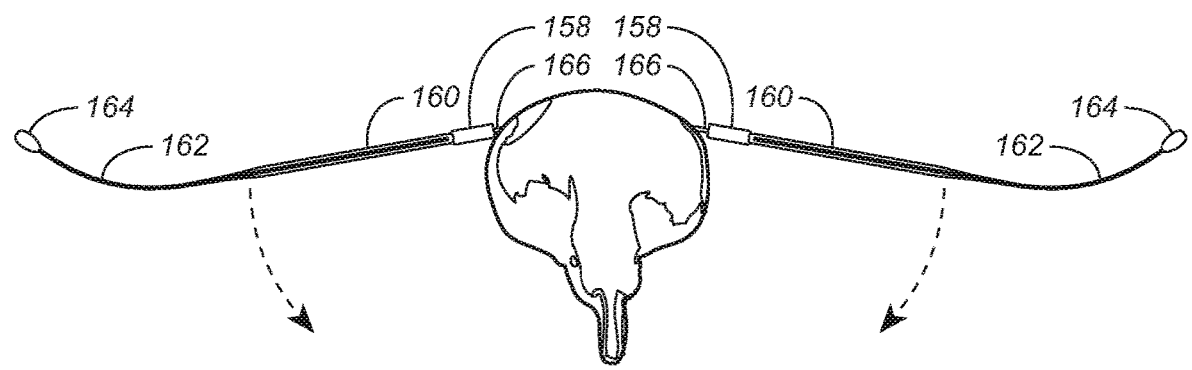
FIG. 7B is a front elevation view thereof showing the wings to the side of the body and continuing their downward movement.
Figure 7C:
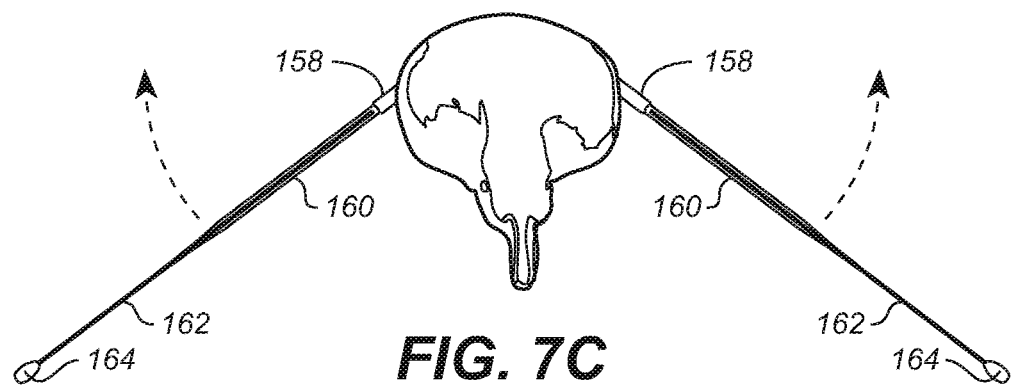
FIG. 7C is a front elevation view thereof showing the wings to lowered at an angle to the body but moving upward.
Figure 7D:
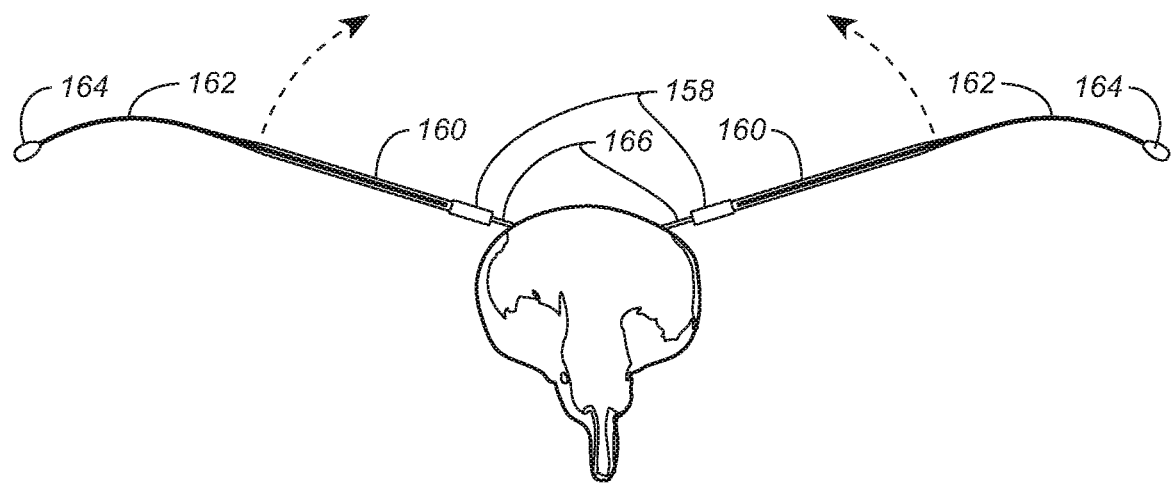
FIG. 7D is a front elevation view thereof showing the wings to the side of the body and continuing their upward movement.

Referring in addition now to FIGS. 2, 6A and 6B, it is seen that the oscillating mechanism 14 comprises an anchor plate 22 having two lateral extensions 24 and two top extensions 26. The two lateral extensions 24 extend to the side walls 28 of the decoy body 12. Fasteners 30 passing through lateral attachment holes 32 (see FIG. 6B) in the decoy body are threaded into fastener holes 34 in the lateral extensions 24. Similarly, the two top extensions 26 extend to the top wall 36 of the decoy body 12. Fasteners 30 passing through top attachment holes 38 (see FIG. 6A) in the top wall of the decoy body are threaded into fastener holes 40 in the top extensions 26. The oscillating mechanism is thereby firmly anchored to the decoy body 12. The support rod 18 is received in one of a plurality of downwardly oriented support rod receiving holes 42 located in the bottom end of the anchor plate 22. In one embodiment of the invention two support rod receiving holes 42A and 42B are provided having different angles for orienting the decoy body 12 at a selected angle to an underlying support surface. An access hatch 44 formed in the bottom side of the decoy body 12 (see also FIG. 6B) is closed with stopper 46. A rod opening 48 for support rod 18 is provided in stopper 46.

A motor 50 is attached to the back surface of anchor plate 22 with fasteners 54 such that the motor's drive shaft 56 extends through drive shaft opening 58 and forward of front surface 60. A controller 53 operatively attached to the motor, controls the speed of the motor 50. In one embodiment of the invention, the motor 50 is a 12V DC motor operating at speed between 150 and 220 rpm. Although in the illustrated embodiment, speed controller is shown mounted in the cavity of the decoy body, it may be located externally and may be wired to the motor or controlled remotely using predefined speed increments or a variable speed control.

Drive shaft 56 is received in the center aperture 62 of drive wheel 64 such that activation of motor 50 rotates drive shaft 56 and drive wheel 64. In one embodiment, drive shaft 56 has a polygonally shaped cross-section and center opening 62 has a corresponding shape to maximize transmission of rotational torque from the drive shaft 56 to the drive wheel 64. Drive shaft 56 is further secured in center aperture 62 by set screw 65 which when tightened in radial aperture 66 engages and retains drive shaft 56 in aperture 62. In one embodiment, a ferrule 65A is inserted in aperture 66 and set screw 65 is threaded into it.

Figure 3A:
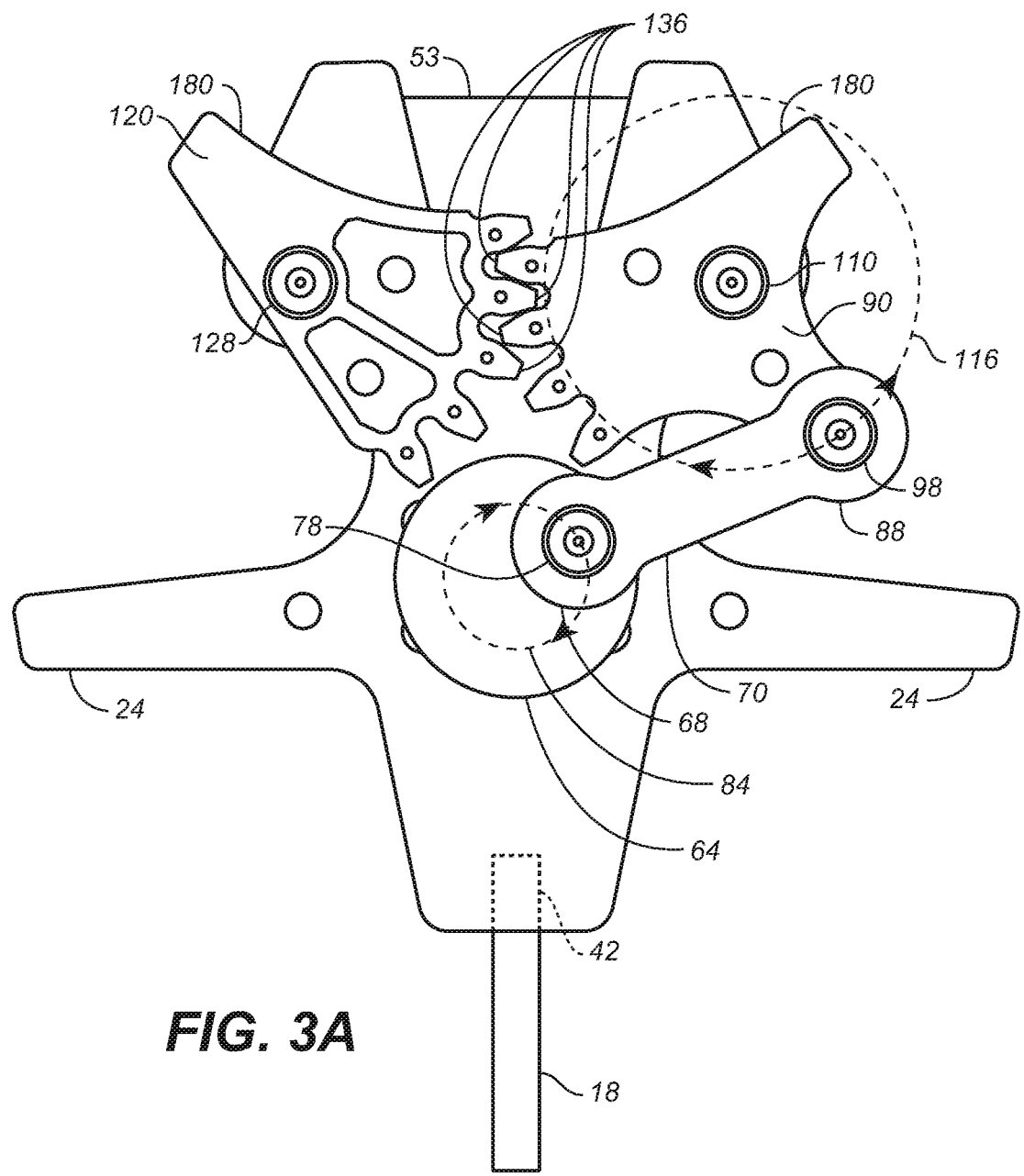
FIG. 3A is a front elevation view of the oscillation mechanism thereof.
Figure 3B:
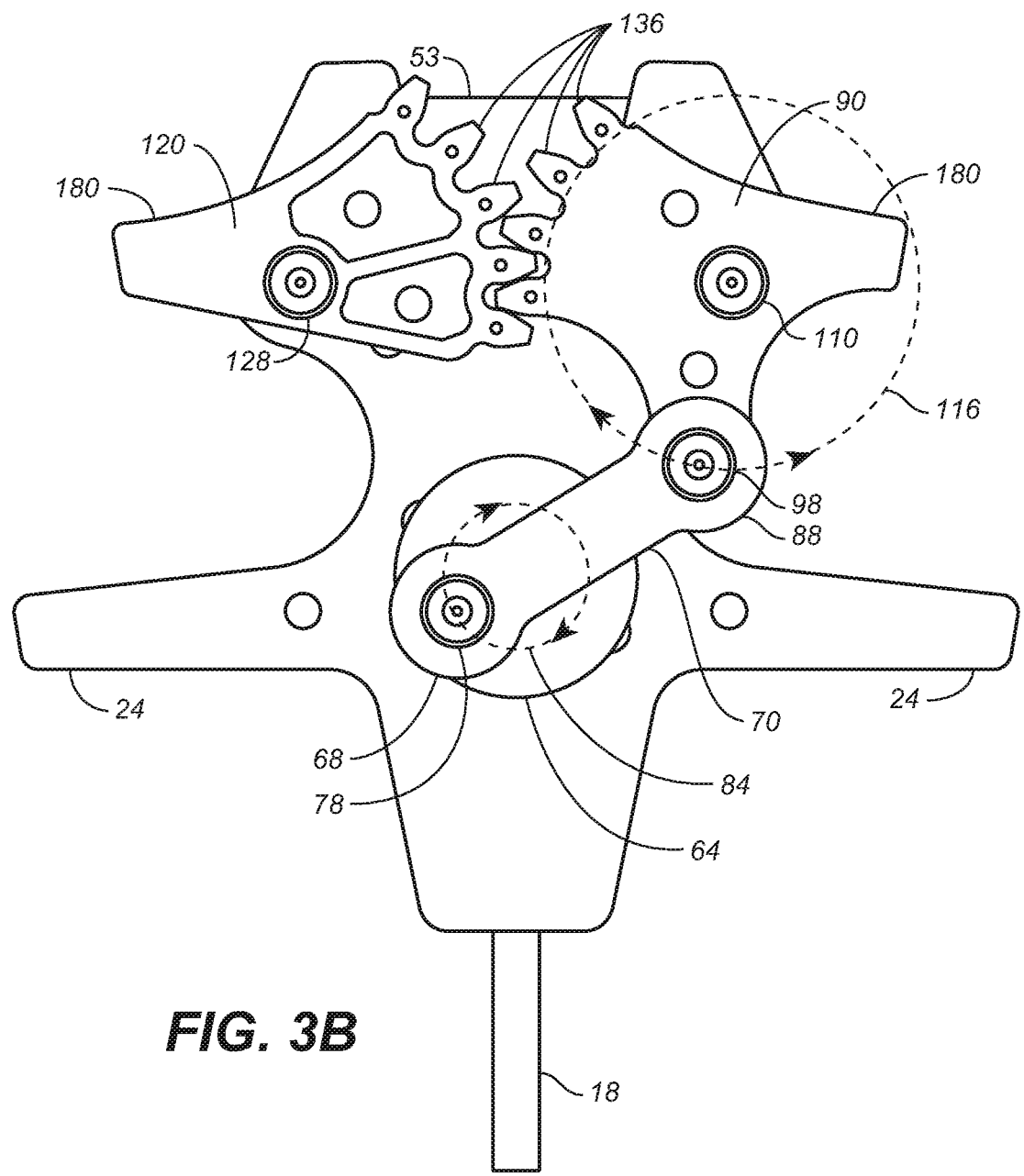
FIG. 3B is a front elevation view of the oscillation mechanism similar to FIG. 3A but wherein the drive wheel, drive link and wing gears have been moved to a different configuration.

With continuing reference to FIG. 2, it is seen that a first end 68 of drive link 70 is pivotally interconnected with drive wheel 64 via first end pivot pin 72. A forward end 74 of first end pivot pin 72 is secured in the first end aperture 76 of drive link 70 with fastener 78. A rear end portion 80 is pivotally received in eccentrically-located drive wheel pivot pin aperture 82, such that rotation of drive wheel 64 moves first end pivot pin 72 and the first end 68 of drive link 70 through a drive orbit 84 (shown in FIG. 3B) concentric with a drive shaft axis 86 formed by drive shaft 56.

The second end 88 of drive link 70 is similarly pivotally interconnected with first wing gear 90 via second end pivot pin 92. The forward end 94 of second end pivot pin 92 is secured in the second end aperture 96 of drive link 70 with fastener 98. The back end portion 100 is pivotally received in first wing gear distal pivot pin aperture 102.

First wing gear 90 in turn is pivotally interconnected with anchor plate 26 via first wing gear pivot pin 104, the forward end 106 of which is secured in first wing gear center pivot pin aperture 108 by fastener 110, and the rear portion 112 of which is pivotally received in first anchor plate pivot pin aperture 114. Thus, with additional reference to FIGS. 3A and 3B, it can be seen that the second end 88 of drive link 70 causes the second end pivot pin 92 and first wing gear distal pivot pin aperture 102 to reciprocate along an arc of orbit 116 as first wing gear 90 pivots about first wing gear pivot axis 118 formed about first wing gear pivot pin 104.

Referring again to FIG. 2, second wing gear 120 is pivotally interconnected with anchor plate 26 via second wing gear pivot pin 122, the forward end 124 of which is secured in second wing gear pivot pin aperture 126 by fastener 128, and the rear portion 130 of which is pivotally received in second anchor plate pivot pin aperture 132, such that second wing gear 120 pivots about a second wing gear pivot axis 134 formed by second wing gear pivot pin 122.

The inner portions of first and second wing gears 90, 120 have intermeshed gear teeth 136 such that rotational movement of first wing gear 90 causes corresponding counter-rotational movement of second wing gear 120. Thus, as drive wheel 64 rotates, the first end 68 of drive link 70 moves through orbit 84, which in turn moves the second end 88 of drive link 70 reciprocally through an arc of orbit 116 about first wing gear pivot axis 118, which causes first and second wing gears 90, 120 to pivot reciprocally about first wing gear and second wing gear pivot axes 118, 134, respectively.

With reference to FIGS. 4 and 5A-5C and 5B, each of wings 20 comprises a wing panel 140 shaped to resemble the wing of a waterfowl in flight, a wing strut pocket 142 on its leading edge 144 for receiving a wing strut 146, and a fastener pocket 148 on its inner edge 150 for receiving a wing fastener 152. It is anticipated that the wing panel 140 will be manufactured from a lightweight, flexible material such as fabric. The leading edge 144, wing strut pocket 142, and wing strut 146 are shaped to closely resemble the leading edge of the wing of a waterfowl in flight. The wing strut 146 is introduced into the wing strut pocket 142 through wing strut slot 154 on the underside 156 of panel 140.

Each wing strut 146 comprises a base portion 158, a proximal portion 160 extending outwardly from the base portion, and a distal portion 162 extending outwardly from the proximal portion, to a tip 164. In the illustrated embodiment an attachment pin 166 extends inwardly from the base portion 158 for insertion into the wing strut apertures 180 discussed below. In other embodiments the attachment pin may be magnetic for coupling with the oscillation mechanism or may include a spring-loaded detent to retain the attachment pin in an aperture in the oscillation mechanism. The proximal and distal portions 160, 162 comprise an elongated flexible band 168 substantially disposed in a plane parallel with the plane of the wing panel. Referring to FIG. 5C, the proximal portion 160 includes reinforcing ribs 170 extending axially along and perpendicular to band 168 to strengthen and stiffen the proximal portion of the wing strut. In the illustrated embodiment, the reinforcing ribs 170 are formed integrally with the band 168. The tip 164 of the wing strut 146 in the illustrated embodiment is ovoid-shaped to provide a smoother edge profile to avoid snagging the wing strut pocket 142 when the wing strut is being inserted therein. In other embodiments the tip may be in other rounded shapes that avoid such snagging. In the illustrated embodiment, the tip 164 is enlarged perpendicularly to the wing plane in order to increase its weight. The increased weight at the end of the more flexible distal portion 162 of the wing strut 146 helps to create a whipping action that closely resembles the wing motion of a waterfowl as shown in FIGS. 7A-7D. The wing strut 146 may comprise polyethylene that has suitable strength and flexibility properties.

Figure 4:
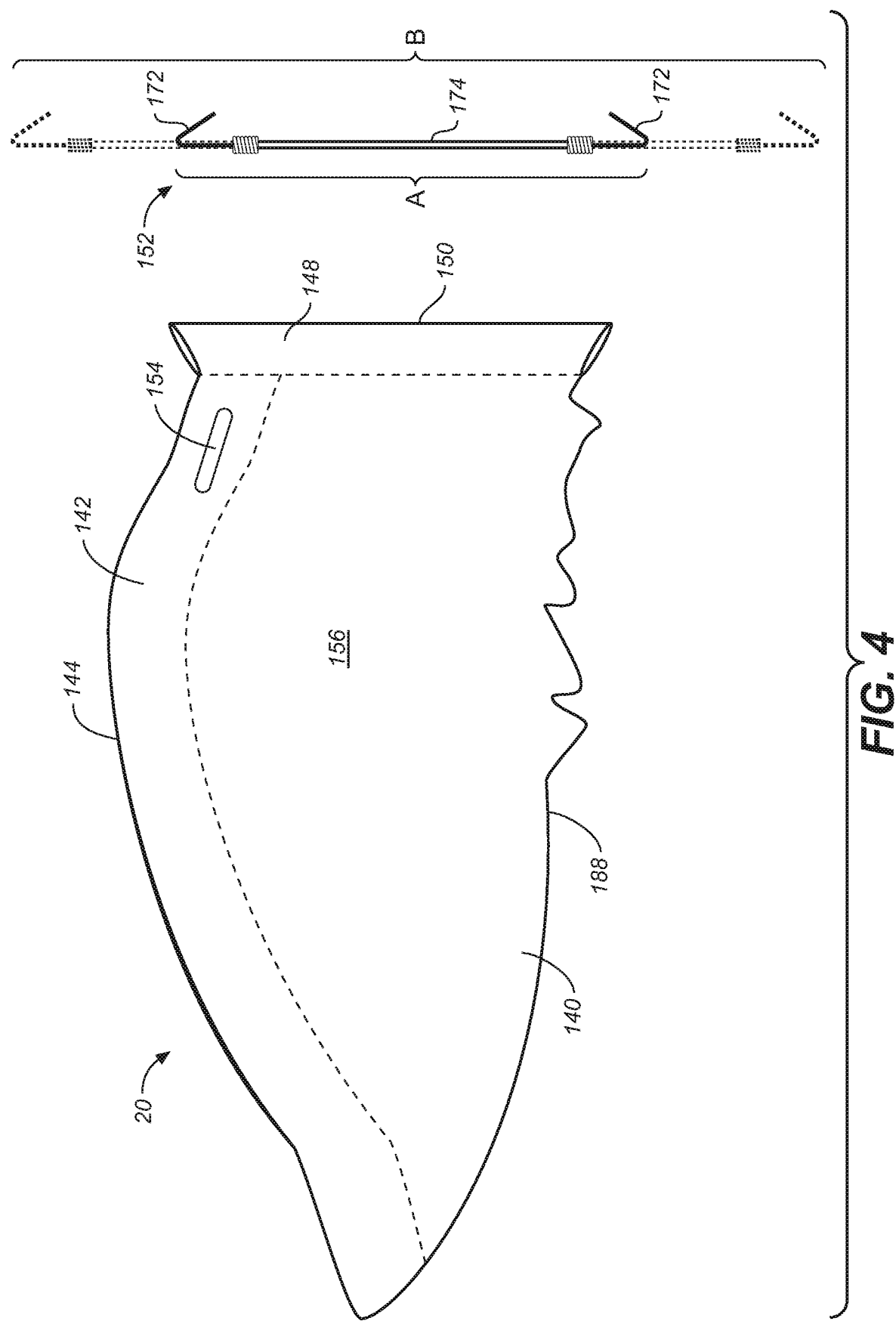
FIG. 4 is a bottom plan view of one of the wings thereof.

The wing fastener 152 for attaching the wing 20 to the decoy body 12 includes a pair of hooks 172 interconnected by an elastic cord 174 such that the hooks can be pulled apart from a relaxed state A to a biased state B as shown in FIG. 4. The wing fastener 152 is held in the fastener pocket 148 and when it is stretched to biased state B, the hooks 172 extend at least partly out of each end of the pocket.

With additional reference to FIGS. 6A and 6B, each pair of hooks 172 fits in a pair of spaced apart wing fastener holes 176 located on the top wall 36 of the decoy body 12, thereby holding the wing panel 140 to the decoy body. The wing strut 146 is attached to the oscillation mechanism 14 by inserting the attachment pin 166 through wing slots 178 in the side walls 28 of the decoy body 12 into a wing strut aperture 180 provided in each of the laterally-extending wing attachment arms 182 of the first and second wing gears 90, 120. Set screws 184 may optionally be used to further secure the attachment pins 166 in the wing strut apertures of wing gears 90, 120. In one embodiment, the attachment pin 166 has a polygonal cross-section and the wing strut aperture 180 has a correspondingly shaped polygonal cross-section such that the attachment pin 166, and hence the wing strut 146, is prevented from rotating within the aperture.

Thus, it can be seen that activation of motor 50 turns motor shaft 56 which then rotates drive wheel 64 thereby moving the first end 68 of drive link 70 through orbit 84 around drive shaft axis 86. Movement of first end 68 causes the second 88 of drive link 70 to reciprocate along an arc of orbit 116 around, and causes wing gear 90 to oscillate about, first wing gear pivot axis 118. Oscillation of first wing gear 90 causes second wing gear 120 to oscillate in a corresponding reverse swiveling motion, thereby moving attachment arms 182 up and down, thereby causing wings 20 to oscillate up and down. As each wing strut 146 moves up or down, the less flexible proximal portion 160 follows the motion of the wing gears 90, 120 more closely while the more flexible distal portion 162 follows at a delayed rate and swings more widely. Additionally, whereas the motion of the leading edge 144 of the wing panel 140 corresponds directly to the motion of the wing strut 146, the following edge 186 tracks the motion of the leading edge 144 at a delayed rate caused by the flexibility of the panel material, the added weight of wing tip 164, and air resistance. The combination of properties of the wing strut 146 and the wing panel 140 result in a sinuous bi-directional reciprocating motion developing radially from the inner edge 150 to the outer tip 188 of the wing panel, and front to back, from the leading edge 144 to the following edge 186 of the wing panel 140, that closely resembles the flapping of a bird's wings.

In addition to serving as a housing for oscillation mechanism 14, decoy body 12 acts as a weather barrier and muffles sounds generated from the motor 50 and moving components 64, 70, 90 and 120. Other sound reduction strategies may include internal insulation or damping materials disposed in the cavity 16 of the decoy body 12 or in or around motor 50.

There have thus been described and illustrated certain embodiments of a waterfowl decoy having oscillating wings according to the invention. Although the present invention has been described and illustrated in detail, it should be clearly understood that the disclosure is illustrative only and is not to be taken as limiting, the spirit and scope of the invention being limited only by the terms of the appended claims and their legal equivalents.

We claim:

1. A wing strut for supporting each of a pair of wings of a waterfowl decoy, the waterfowl decoy having a decoy body, the pair of wings extending from the decoy body, each of the pair of wings disposed in a wing plane aligned parallel to the longitudinal dimension of the bird body, the wing strut comprising:

an elongated band having a proximal portion and a distal portion, the proximal portion for attachment to the body of the waterfowl decoy, the distal portion extending from the proximal portion, and the elongated band disposed coplanar with the wing plane for supporting one of the wings of the waterfowl decoy, the proximal portion comprising one or more reinforcing ribs extending axially along and perpendicular to the elongated band, such that in a direction perpendicular to the wing the distal portion is more flexible than the proximal portion for giving the ends of the pair of wings a greater flapping motion than the portions closer to the decoy body.

2. The wing strut of claim 1 further comprising:
the elongated band being curved in the shape of the leading edge of an extended bird wing during flight.

3. The wing strut of claim 1 further comprising:
the proximal portion being curved and the distal portion extending linearly from the proximal portion so that the proximal and distal portions collectively are formed in the shape of the leading edge of an extended bird wing during fight.

4. The wing strut of claim 1 further comprising:
a base portion for attachment to the body of the waterfowl decoy, the proximal portion extending from the base portion.

5. The wing strut of claim 4 further comprising:
an attachment pin extending inwardly from the base portion for attachment to the decoy body.

6. The wing strut of claim 1 further comprising:
an attachment pin extending inwardly from the proximal portion for attachment to the decoy body.

7. The wing strut of claim 6 further comprising:
the attachment pin having a polygonal profile for securing the wing strut against axial rotation relative to the decoy body.

8. The wing strut of claim 1 further comprising:
an ovoid-shaped tip disposed at end of the distal portion, said tip having a width greater than the elongated band.

9. The wing strut of claim 1 further comprising:
the one or more reinforcing ribs each intersecting axially with the elongated band.

10. The wing strut of claim 1 further comprising:
the one or more reinforcing ribs comprising two reinforcing ribs, said two reinforcing ribs extending in opposite directions from the elongated band.

11. The wing strut of claim 1 further comprising:
the one or more reinforcing ribs formed integrally with said elongated band.

12. A wing strut for supporting each of a pair of wings of a waterfowl decoy, the waterfowl decoy having a decoy body, the pair of wings extending from the decoy body, each of the pair of wings disposed in a wing plane aligned parallel to the longitudinal dimension of the bird body, the wing strut comprising:

an elongated band having a proximal portion and a distal portion, the proximal portion for attachment to the body of the waterfowl decoy, the distal portion extending from the proximal portion, and an attachment pin extending inwardly from the proximal portion for attachment to the decoy body, the proximal portion being curved and the distal portion extending linearly from the proximal portion so that the proximal and distal portions collectively are formed in the shape of the leading edge of an extended bird wing during flight, the proximal and distal portions disposed in the wing plane of one of the pair of wings of a waterfowl decoy, the proximal portion comprising one or more reinforcing ribs extending axially along and perpendicular to the elongated band, such that in a direction perpendicular to the wing the distal portion is more flexible than the proximal portion for giving the ends of the pair of wings a greater flapping motion than the portions closer to the decoy body.

13. A wing strut for supporting each of a pair of wings of a waterfowl decoy, the waterfowl decoy having a decoy body, the pair of wings extending from the decoy body, each of the pair of wings disposed in a wing plane aligned parallel to the longitudinal dimension of the bird body, the wing strut comprising:

an elongated band having a proximal portion and a distal portion, the proximal portion for attachment to the body of the waterfowl decoy, the distal portion extending from the proximal portion, a base portion for attachment to the body of the waterfowl decoy, the proximal portion extending from the base portion, an attachment pin extending inwardly from the base portion for attachment to the decoy body, the attachment pin having a polygonal profile for securing the wing strut against axial rotation relative to the decoy body, and an ovoid-shaped tip disposed at the end of the distal portion, said tip having a width greater than the elongated band, the proximal portion being curved and the distal portion extending linearly from the proximal portion so that the proximal and distal portions collectively are formed in the shape of the leading edge of an extended bird wing during flight, the proximal and distal portions comprising an elongated band disposed in the wing plane of one of the pair of wings of a waterfowl decoy, the proximal portion comprising one or more reinforcing ribs extending axially along and perpendicular to the elongated band, such that in a direction perpendicular to the wing the distal portion is more flexible than the proximal portion for giving the ends of the pair of wings a greater flapping motion than the portions closer to the decoy body.

* * * * *